Feb. 5, 1924.

W. FJELDSTROM

LUBRICANT CONTAINER

Filed Aug. 1, 1921

1,482,843

Inventor
WALTON FJELDSTROM
By E.H.Bord
Attorney

Patented Feb. 5, 1924.

1,482,843

UNITED STATES PATENT OFFICE.

WALTON FJELDSTROM, OF KENASTON, SASKATCHEWAN, CANADA.

LUBRICANT CONTAINER.

Application filed August 1, 1921. Serial No. 488,994.

*To all whom it may concern:*

Be it known that I, WALTON FJELDSTROM, a citizen of the Dominion of Canada, residing at Kenaston, in the county of Saskatoon and Province of Saskatchewan, Canada, have invented certain new and useful Improvements in Lubricant Containers, of which the following is a specification.

The present invention relates to improvements in lubricant containers and the principal object of the invention is to embody a pressure exerting device in conjunction with the container whereby upon actuation of the pressure exerting device, the lubricant will freely flow from the container.

With this and other objects in view, the invention consists in the construction, combination and arrangement of parts as will be hereinafter fully described, illustrated in the accompanying drawings and pointed out in the claim hereunto appended.

Referring to the drawings, like numerals designate like parts in the various drawings.

Figures 1, 2:
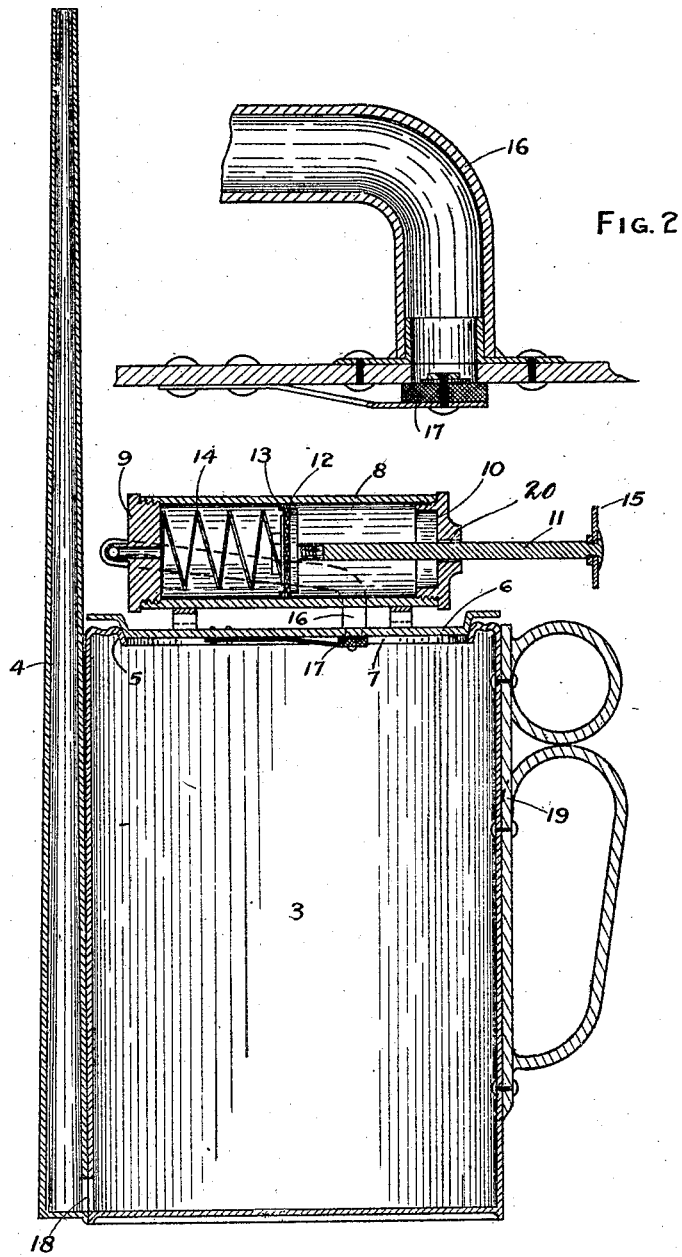
Figure 1 is a vertical transverse section of my improved lubricant container.
Figure 2 is a fragmentary transverse vertical section illustrating the valve mechanism.

The numeral 3 indicates the lubricant container, 4 the lead pipe. The upper portion of the lubricant container is cottised as indicated by the numeral 5 and a detachable cover 6 is positioned thereon.

The lubricant is positioned in the lubricant container 3 through the opening indicated by the numeral 7. The pressure energizing apparatus is positioned on the detachable cover 6 and consists of a cylindrical casing 8, having demountable caps 9 and 10 positioned on the ends thereof, as indicated diagrammatically. Piston rod 11 is reciprocatably positioned centrally in the chamber of the cylindrical casing 8 and has a piston 12 positioned on its inner end. A fibrous washer 13 operates to allow the atmosphere past the same on the reciprocation of the piston 12.

A suitable coil spring 14 is positioned intermediate the inner face of the cap 9 and the piston 12. This coil spring is functioned to exert an outward tension of the piston 12. A suitable knob 15 is positioned on the outer end of the piston rod 11. The air pressure exerted in the chamber of the cylindrical casing 8 communicates with the interior of the lubricant container by means of the communication pipe 16 which is connected at one terminal with the end cap 9 of the cylindrical casing and at its opposite terminal, a valve 17 is positioned.

An opening indicated by the numeral 18 connects the interior of the lubricant container with the lead pipe 4. A suitable handle 19 is positioned on the exterior of the lubricant container, preferably in alignment with the knob 15 positioned on the piston rod 11.

In operation, an exertion is imparted on the knob 15 by means of the operator's thumb and the piston 12 travels inwardly. The atmosphere intermediate the inner face of the piston 12 and the cap 9 is forced through the communication tube 16 and the valve 17 is thrown open. The atmosphere now passes to the lubricant container 3. Pressure is then released from the piston rod 11 and the coil spring 14 forces the same outwardly. Upon this outward stroke, the atmosphere rushes through the opening 20 and passes around the circumferential periphery of the washer member 13. Upon the inward stroke of the piston, the same action as aforementioned takes place again. When a suitable pressure is exerted on the lubricant in the container, all that is necessary when it is desired to extract the lubricant from the lead pipe 4 is an inward stroke on the piston rod 11. This auxiliary pressure, in co-operation with the pressure now in the lubricant container 3, forces the lubricant through the opening 18 and out the lead pipe 4.

The lubricant container 3 may be filled by means of the opening 7 and this opening 7 also facilitates the cleansing of the lubricant container.

While I have illustrated and described the preferred form of construction of my invention, this is capable of variation and modification without departing from the spirit of the invention. I, therefore, do not wish to be restricted to the precise details of construction specified, but desire to avail myself of such variations and modifications as come within the scope of the appended claim.

From the foregoing, it is thought that the construction of my invention will be clearly understood and, therefore, a more extended explanation has been omitted.

What I claim as new is:

A device of the character described, comprising a lubricant container, a lead pipe located externally of the container, but communicating at the lower end therewith, a relatively large cover closing the upper end of the container and having a port therethrough, a fluid pump comprising a cylinder mounted on the cover, means supporting the cylinder above the cover, removable covers for the end of the cylinder, a piston slidably mounted in the cylinder and manually operated in one direction, a spring operating the piston in the opposite direction, a pipe connecting the cylinder with the port in the cover and disposed directly over the said port and over the control valve and a spring control valve mounted on the lower face of the cover and removable therewith and coacting with the port, the cover, the pump and valve being removable as a unit from this container said pump being disposed entirely outside the container.

In testimony whereof I affix my signature in the presence of two witnesses.

WALTON FJELDSTROM.

Witnesses:
JOHN FJELDSTROM
H. HAYGARTH.